Feb. 7, 1967  J. E. HENRY  3,303,253
METHOD AND APPARATUS FOR EXTRUDING THERMOPLASTIC MATERIAL
Filed March 23, 1964  3 Sheets-Sheet 1
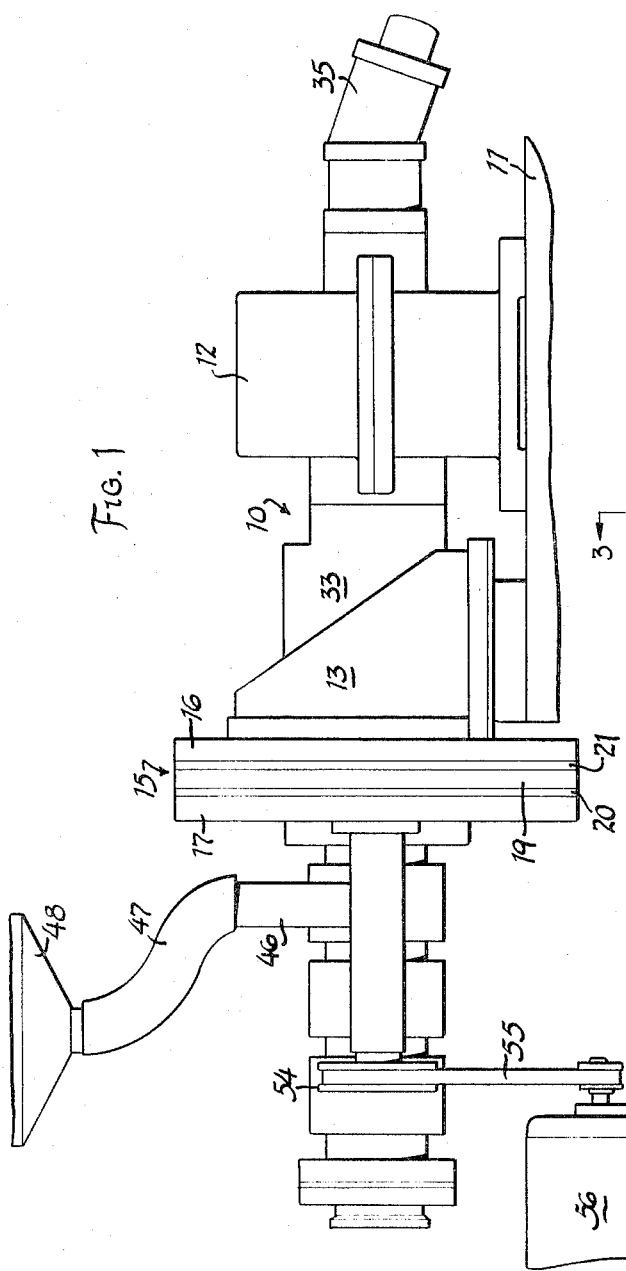
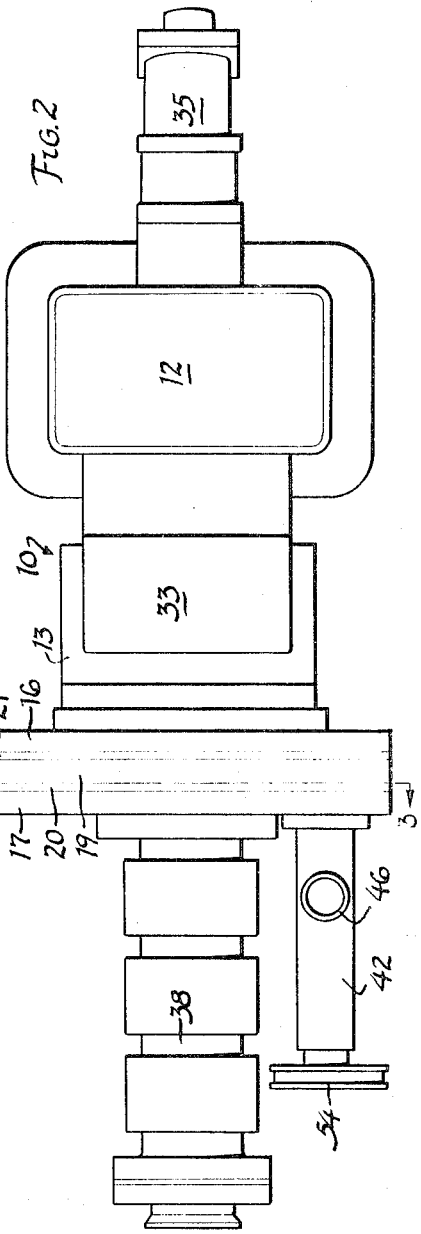
INVENTOR.
JAMES E. HENRY
BY Spencer L. Blaylock, Jr.
W. D. Schaich
ATTORNEYS Feb. 7, 1967   J. E. HENRY   3,303,253
METHOD AND APPARATUS FOR EXTRUDING THERMOPLASTIC MATERIAL
Filed March 23, 1964   3 Sheets-Sheet 2
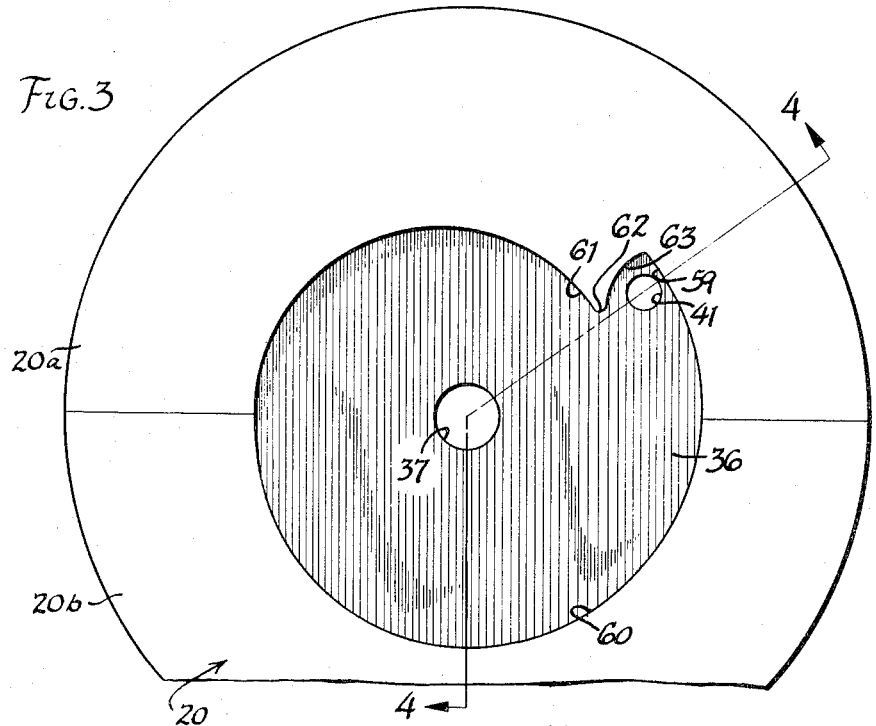
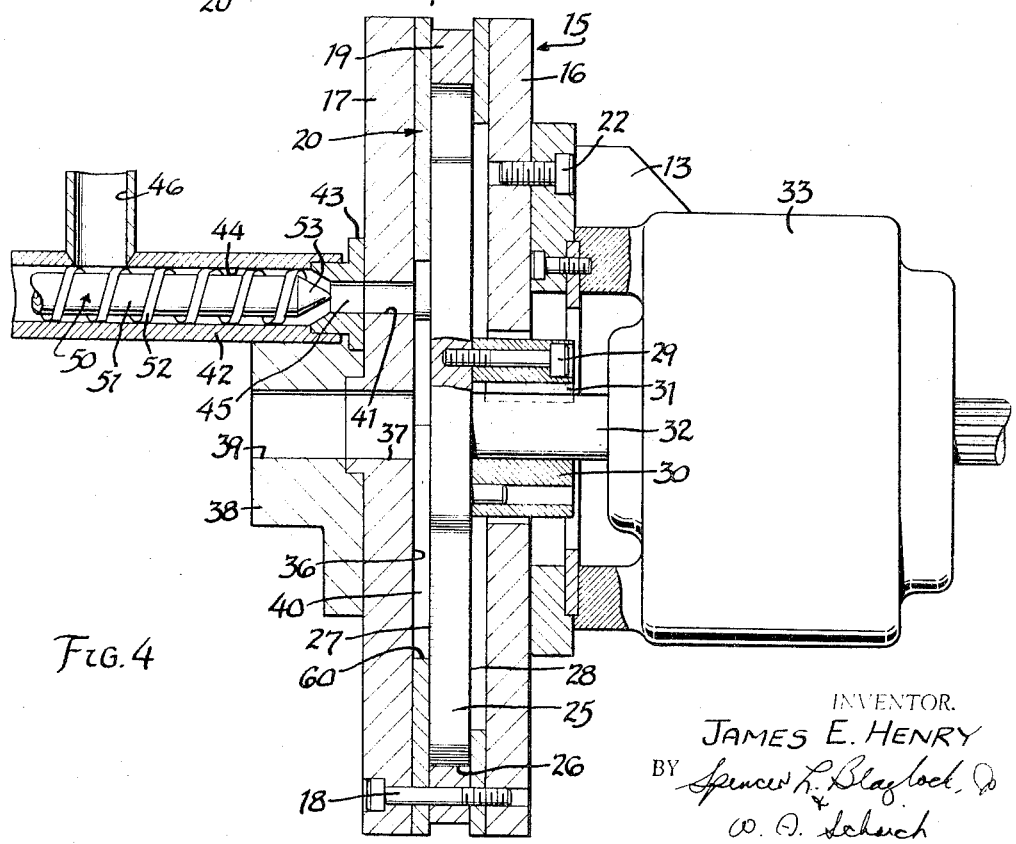
INVENTOR.
JAMES E. HENRY
BY Spencer L. Blaylock
W. A. Schuch
ATTORNEYS FIG. 5
FIG. 6
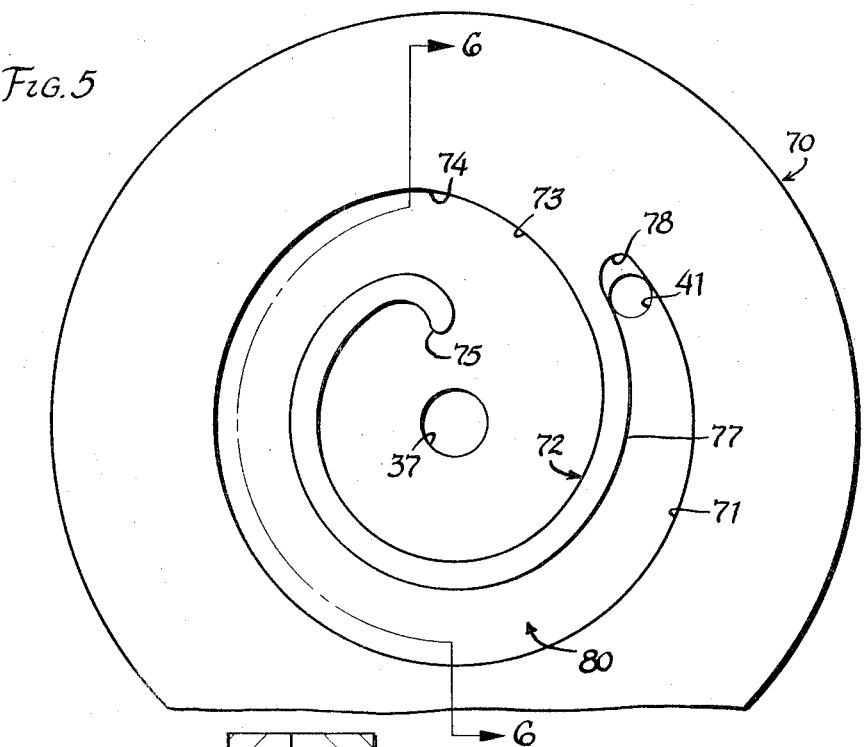
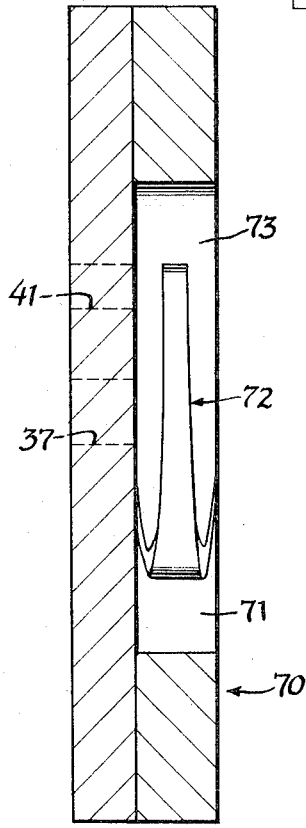

3,303,253
METHOD AND APPARATUS FOR EXTRUDING THERMOPLASTIC MATERIAL
James E. Henry, Bound Brook, N.J., assignor to Owens-Illinois, Inc., a corporation of Ohio
Filed Mar. 23, 1964, Ser. No. 353,855
8 Claims. (Cl. 264—176)

The present invention relates to an elastic melt extruder and to a method of operating such an extruder. More particularly, this invention relates to an elastic melt extruder in which solid plastic material is fed to a shearing gap by an external feeding means for issuance from an extrusion orifice, material directing means being provided in the gap to enhance the feeding and extrusion efficiency of the device.

There has been recently developed a new type of plasticizer-extruder, commonly known as an "elastic melt extruder" utilizing the "Weisenberg Effect" or the normal force effect, i.e., the normal force developed when a viscoelastic material is sheared between a rotating plate and a stationary plate, to perform the functions of a conventional plasticizer-extruder. Such an elastic melt extruder is described in detail in "Modern Plastics Magazine" of October 1959, at page 107, in an article by Bryce Maxwell and Anthony J. Scalora.

A conventional elastic melt extruder utilizes a power-driven, rotatable disc operable within a convolute chamber defined between the rotatable disc and a fixed disc and to which solid plastic material is furnished from a supply hopper or the like. The confronting radial faces of the discs are spaced through a narrow gap, and one of the discs, usually the fixed disc has an exit orifice axially aligned with the disc. As the one disc is rotated, the thermoplastic material introduced peripherally of the disc and confined between the radial shearing faces of the disc and the orifice plate is subjected to shearing forces. The thermoplastic material is essentially elastic, and the tendency of the sheared material for elastic recovery after arcuate shearing and stretching between the radial faces effects centripetal flow of material between the discs toward the central orifice, the material issuing from the orifice in plasticized condition at a pre-determined pressure.

In a conventional elastic melt extruder, as above described, the solid plastic material is fed to the shearing gap by gravity flow from an overhead hopper. During the operation of such conventional devices, the granulated solid material may bridge over the entrance passage to the shearing gap to interrupt, at least momentarily, the uniform feeding of the material. Further, it is difficult to obtain uniform feeding peripherally of the shearing gap.

The problems of feeding the particulate, unplasticized material to the melt chamber or "gap" may be further complicated by the utilization of the particulate material in various forms, i.e., as pellets, powders or flakes. Additionally, any successful feed system must be capable of utilization with various types of thermoplastic materials, such as high density polyethylene, low density polyethylene, nylon, polystyrene, polypropylene, and poly-vinyl chloride. When the variations in the form and density of the particulate material are combined with the variations in the material, some system of positive feeding is critical in order to obtain consistent, high volume output from an extruder of the elastic melt or centripetal type.

In the copending application of myself and Nicholas J. Curto, Serial No. 349,241, filed March 4, 1964, and assigned to the assignee of this application, there has been proposed an improved positive feed means for insuring the constant, peripheral flow of plastic material to the shearing gap, plasticized material being issued from the gap at pressures generally higher than those generated in conventional elastic melt extruders.

Specifically, our earlier application proposed the introduction of the particulate material into the chamber through one of the relatively rotatable discs or plates between which the chamber is defined. By perforating the one plate, an opening is provided directly into the chamber in opposing relationship to the melt chamber face of the rotatable plate at a peripheral portion thereof. This aperture communicates through a suitable conduit with a source of particulate, or unplasticized materials, and the material is introduced from the source, through the conduit, and into the chamber in any desired fashion.

One particularly desirable arrangement of the earlier invention utilizes a feed screw with the conduit being formed as a cylindrical barrel communicating at one end with the aperture and communicating in spaced relation thereto with a supply hopper or the like. The screw is of substantially constant lead and pitch, and serves to convey the particulate material into and through the aperture with sufficient momentum, and with sufficient mechanical advantage, to insure the rapid, smooth introduction of the material into the melt chamber.

By rotating the screw at a relatively high speed the material can be introduced into the chamber with sufficient momentum to directly impinge the material upon the melt chamber face defined by the rotatable disc or plate, the material entering the chamber in a substantially straight line and being deflected by its contact with the plate, or with material on the face of the plate, into the spiral path which finally results in the material being extruded from the axial orifice in a plasticized state.

I have now found that the device of the above-identified invention can be further improved by modifying the peripheral contour of the melt chamber. More specifically, a deflection surface is provided adjacent the location at which the unplasticized material is introduced into the chamber, thus preventing admixture of such material with at least partially plasticized material circulating in the chamber. Such a surface may be of limited extent, thus merely deflecting circulating material from the point of entry of fresh material, or the surface may be of substantial peripheral extent to sub-divide the melt chamber into concentric outer heating and inner plasticizing zones. In either event, the feeding efficiency is substantially enhanced, the smooth flow of material into and through the melt chamber is insured, and incoming material is deflected peripherally toward the extrusion orifice.

Where concentric outer and inner zones are provided, the incoming material is segregated from previously introduced material until such time as the incoming material has been heated sufficiently to be rendered at least partially fluid. Once the incoming material has become at least partially fluid, the material is subjected to the normal force effect and moves centripetally toward the centrally located extrusion orifice. Preferably, the deflection surface is defined by a wall of graduated, peripherally diminishing thickness so that incoming material which becomes sufficiently fluid for centripetal movement can by-pass the surface.

Thus, it is an object of the present invention to provide a new and improved method of and apparatus for introducing particulate material into an elastic melt extruder in a pre-determined direction thereby increasing the output efficiency and operational consistency of such an extruder.

Another important object of the present invention is to provide a method of introducing particulate thermoplastic material into an elastic melt extruder melt chamber to be plasticized therein, the material being introduced through one of the relatively rotatable plates defining the melt chamber at a peripheral portion of the chamber and in a direction generally parallel to the axis of rotation of the plates, and deflecting the material peripherally of the chamber and in a helical path toward the axis of plate rotation.

It is a further important object of the present invention to provide an apparatus for increasing the efficiency of an elastic melt extruder by introducing particulate, unplasticized material into the melt chamber at a peripheral portion of the chamber and through an aperture formed in one of the relatively rotatable plates defining the chamber and by providing a peripheral deflection surface delaying admixture of the particulate material and material already in the chamber.

It is another, and no less important object of the present invention to provide an improved method of extrusion utilizing an elastic melt extruder wherein a pair of relatively rotatable plates define therebetween an elastic melt chamber from which plasticized material issues through an orifice co-axial with the axis of rotation of the plates, and wherein one of the plates is apertured to provide for the ingress of unplasticized material into the chamber by introducing particulate material through said aperture segregating such material from fluid material in said chamber until such time as such material becomes at least partially fluid, and then centripetally moving the at least partially fluid material toward the orifice.

Other objects of this invention will appear in the following description and appended claims, reference being had to the accompanying drawings forming a part of this specification wherein like reference characters designate corresponding parts in the several views.

On the drawings:

FIGURE 1 is a side elevational view of an elastic melt extruder mechanism of the present invention;

FIGURE 2 is a plan elevational view of the mechanism of FIGURE 1;

FIGURE 3 is an enlarged fragmentary, sectional view taken along the plane 3—3 of FIGURE 2;

FIGURE 4 is a sectional view, with parts shown in elevation, taken along the plane 4—4 of FIGURE 3;

FIGURE 5 is a view similar to FIGURE 3 of a modified form of the present invention; and FIGURE 6 is a sectional view taken along the plane 6—6 of FIGURE 5.

As shown on the drawings:

In FIGURE 1, reference numeral 10 refers generally to an apparatus of the present invention, comprising a stand or support 11 having an upwardly projecting support 12 and a second adjacent support bracket 13. Secured to the support bracket 13 is the extruder mechanism per se, indicated generally at 15.

The extruder mechanism comprises a pair of fixed, cylindrical end plates 16, 17 inter-connected by a series of peripherally spaced bolts 18. Interposed between the plates is a central, annular ring 19, a spacer 20 interposed between the ring 19 and the front plate 17, and a second spacer 21 interposed between the ring 19 and the rear plate 16. The rear plate 16 is secured to the bracket 13 by suitable means, as by bolts 22. The assembly of the rear plate 16, the front plate 17, the ring 19 and the spacers 20, 21 are fixedly secured in position by means of the brackets 13 and the base 11.

Also interposed between the plates 16, 17 is a rotatable, generally cylindrical plate 25, this plate having its exterior periphery 26 closely peripherally confined by the ring 19 and having its front and rear faces 27, 28, spaced from the front and rear plates 16, 17 by the spacers 20, 21, respectivley. The plate 25 has secured thereto, as by bolts 29, an annular drive ring 30 keyed, as by element 31, to a drive shaft 32, this shaft being supported in and journaled by a bearing (not shown) within a bearing housing 33, the shaft 32 projecting rearwardly beyond the bearing housing 33 to be driven by suitable means, as by a change speed gear set (not shown) supported by the support 12, and an electric motor encased within a housing 35.

From FIGURE 4 it will be noted that the interior surface 36 of the front plate 17 is provided with a central outlet opening or orifice 37 communicating with an outlet extension 38 having an interior passage 39 registering with the orifice 37. This orifice 37 communicates with a gap 40, defined between the spaced confronting faces 27, 36 of the rotatable plate 25 and the fixed plate 17, respectively. This gap 40 defines the "melt chamber" and relative rotation between the confronting faces 27, 36 defining the chamber will cause plasticized material introduced thereinto to be plasticized by the visco-elastic effect generated in the gap 40.

Unplasticized or particulate thermoplastic material is introduced into the gap or chamber 40 through an aperture 41 in the front or fixed plate 17. From FIGURE 3 it will be noted that this aperture 41 is located peripherally of the chamber or gap 40 and further, it will be noted that the aperture is cylindrical about an axis parallel to the axis of the orifice 37, and further parallel to the axis of the shaft 32, i.e., the axis of relative rotation of the plates 17, 25.

This apparatus 41 communicates with a conduit or "barrel" 42 which is fixed to the plate through a mounting block 43, the barrel 42 having an axial passage 44 therethrough registering with the aperture 41 and communicating therewith through an aperture 45 in the block 43. The conduit passage or bore 44 communicates through a radial supply passage 46 and a flexible conduit or hose 47 with an overhead supply hopper or storage unit 48. Disposed in the passage 44 is a rotatable screw indicated generally at 50, and comprising a cylindrical central portion 51 surrounded by a helical raised thread 52, and terminating at its forward end in a tapered nose portion 53 projecting into the mounting block 43. This screw is driven in any suitable manner, as by a sheave 54 mounted on that portion of the screw projecting beyond the barrel 42, a drive belt 55 and an electric motor 56.

In the operation of the device heretofore described it will be obvious that actuation of the motor 56 will drive the screw 50 in a direction such that material introduced into the barrel passage 44 from the hopper 48, through the conduit 47 and the passage 46 will be advanced by the screw to be displaced thereby through the mounting block passage 45 and the aperture 41, directly into the gap or melt chamber 40. The plasticized material thus will be introduced at a peripheral portion of the chamber 40.

As will be readily apparent from FIGURES 3 and 4, the gap 40 is circumscribed by the central aperture 60 of the spacer 20. Further, as illustrated in FIGURE 3, this spacer 20 may be made in two halves, indicated at 20a and 20b to facilitate the fabrication and assembly of the spacer in its position interposed between the fixed plate 17 and the rotatable plate 25.

The configuration of the plate aperture 60 is of extreme importance, this aperture being concentric about the orifice 37 and about the axis of the drive shaft 32, i.e., the rotational axis of the plate 25. However, the aperture 60 is of variable radius, i.e., of an over-all helical configuration. The largest radiused portion 59 of the aperture 60 is aligned with the feed port 41. The aperture radii diminishing progressively in a clockwise direction (as viewed in FIGURE 3 of the drawings) until the smallest radial portion, indicated at 61, overlaps the largest diameter portion 59. This overlapping forms a peripherally protuberant convex nose 62 lying radially inwardly of the aperture 41 and from which the aperture curves reversely, as at 63, for juncture with that portion 59 thereof of largest radius adjacent the port 41. The juncture of the portions 59 and 63 is displaced counterclockwise from the port 41 to leave the port 41 unrestricted.

Thus, the aperture 61 circumscribes the melt gap 40 with a peripheral wall which is helical in over-all configuration and which is of progressively decreasing radius in the direction of rotation of the rotatable plate 25. Thus, particulate material fed into the gap 40 will freely enter the gap through the aperture 41, and this material will be progressively deflected by the peripheral wall of the gap radially inwardly toward the outlet orifice 37 as this material is frictionally engaged by the gap-defining face 27 of the rotatable plate 25.

By the time the material attains the position of the smallest radial dimension of the aperture 60, the material is probably at least partially fluid, so that it is being subjected to the "Weisenberg Effect" or the normal force effect, effective to centripetally move the material radially inwardly toward the orifice 37. If the material is not sufficiently fluid to be subjected to these effects, the material is thrown outwardly by centrifugal force and the helical configuration of the aperture 60 will deflect the material away from the aperture 41 to prevent the formation of the usual conglomerate ball of partially plasticized and unplasticized material. Additionally, the deflection of the material toward the outlet orifice 37 will tend to form a "dead spot" adjacent the inlet aperture 41, effectively preventing the backflow of material under pressures generated by the visco-elastic plasticizing of the material in the melt chamber 40.

In that embodiment of the invention illustrated in FIGURES 5 and 6, a more elaborate, deflecting surface structure is provided.

Here, the plate 70 is substituted for the plate 20 illustrated in FIGURES 3 and 4, the plate 70 thus being interposed between the fixed face 36 and the rotatable face 27, defining therebetween the melt chamber 40. The plate 70 is circular in cross-sectional configuration and is provided with a concentric circular aperture 71.

The plate is provided with a radially inwardly projecting helical wall indicated generally at 72, the wall being defined between an inner surface 73 merging smoothly with the wall of the aperture 71, as at 74, and projecting radially inwardly in a smooth helical pattern to terminate at 75. The wall 73 is about 360° in arcuate extent and, by virtue of its helical shape, is effective to deflect plasticized material radially inwardly toward the orifice 37 in the face 36 of the fixed plate 17.

The outer wall surface 77 is substantially uniformly spaced from the inner walls 73, this outer face 77 thus being of substantially the same helical configuration as the inner wall 73, but of less peripheral extent. The outer wall surface 77 is joined to the wall 71 of the plate aperture by means of a concavely curved joining portion 78, and the wall surface 77 is spaced sufficiently from the aperture surface 71 in the area of the feed opening 41 to fully expose the feed opening so that particulate material may flow therefrom into the aperture 71.

As best illustrated in FIGURE 6, the wall 72 is of steadily diminishing height throughout the majority of its arcuate extent, the height of the terminal portion 75 thereof being from one-half to one-third the height of the outboard portions thereof, and the axial extent of the wall 72 thus varies from the axial extent of the plate 70 to about one-half to one-third of the axial extent of the plate.

The operation of the device can be best understood by reference to FIGURE 5 of the drawings, wherein it will be seen that particulate, unplasticized material initially fed into the melt chamber will first enter the aperture 71 in the plate 70 through the feed opening 41. Since the rotatable plate 25 is relatively rotating in a *clockwise* direction, as viewed in FIGURE 5, this solid material will be frictionally dragged in the same *clockwise* direction.

Additionally, the incoming material will be confined between the wall of the apertures 71 and the wall 72, actually between the peripheral wall of the aperture 71 and the outer wall surface 77. Since the wall 72 is of an initial height equal to the height or axial extent of the plate 70, the unplasticized material will be confined to a peripherally outer area of the melt chamber, and no intermingling with partially plasticized or plasticized material inwardly of the wall will be possible.

As the plasticized material moves in a clockwise direction through the melt chamber, the plasticized material is heated to become increasingly plasticized so as to be subjected to the "Weisenberg Effect," or the normal force effect, which tends to move such plasticized material radially inwardly toward the orifice 37. Further, such centripetal movement of the plasticized material is facilitated by the reduction in the thickness or height of the wall 72 so that the plasticized material can flow to either side of the wall, thereby leaving the outer flow path indicated generally at 80 and defined between the plate aperture surface 71 and the outer surface 77 of the wall 72. Finally, the clockwise movement of the plasticized material through the melt chamber carries any remaining non-plasticized material with it, such material being centrifugally thrown against the inner wall surface 73 in the area of the juncture of the wall 74 with the plate aperture 71. The inner wall 73 thus deflects this unplasticized material, or only partially plasticized material, in a helical path inwardly toward the orifice 37.

The inner wall surface 73 further prevents any plasticized material from passing adjacent the feed opening 41, thereby preventing intermingling of plasticized or partially plasticized material with the particulate material entering the aperture 41. Thus, the usual conglomerate ball of such material cannot occur. By the time any material has passed through the outer flow path 80 and along the inner wall surface 73 to the end 75 of this surface, the material has been at least partially plasticized and "Weisenberg Effect" will move such material toward the orifice 37 to pass therethrough. The area defined interiorly of the inner wall surface 73 defines the area in which the Weisenberg or normal force effect is most effective, and this area must be as large as the volume of plasticized material within the extruder.

It will readily be seen that the present invention provides two different versions of a peripheral enclosure for an elastic melt chamber which are effective primarily to prevent intermingling of plasticized or partially plasticized material with incoming unplasticized, particulate material. Thus, the present invention effectively prevents the formation of a conglomerate ball of such material which may interfere with the feeding efficiency of the device by clogging the melt chamber inlet opening 41. Further, both versions of the present invention provide helical peripheral surfaces for the elastic melt chamber which direct material introduced thereinto toward the extrusion orifice, thereby aiding in and directing the flow of plasticized material through the melt chamber.

In that version of the invention illustrated in FIGURES 5 and 6 of the drawings, an interior dividing wall is provided for directing material through the melt chamber while still accommodating the exertion of the Weisenberg effect or the normal force effect upon pasticized or partially plasticized material. Additionally, the segregation of the melt chamber into peripherally outer flow path for unplasticized material and an inner open area for plasticized material aids in materially increasing the output potential of the melt chamber.

I claim:

1. In an elastic melt extruder of the type wherein a pair of relatively rotatable plates define therebetween the opposing radial faces of a melt chamber in which particulate thermoplastic material is advanced centripetally to a central outlet orifice to be issued therethrough in a plasticized state, and including a feed mechanism of the positive displacement type for introducing particulate material into said melt chamber through a feed opening in one of said plates opening directly onto said chamber, the improvements of a chamber plate fixed to said one of said pair of plates and axially interposed between said pair of faces, said chamber plate having a central aperture therein freely communicating with said opposing radial faces, the peripheral wall of said aperture circumscribing the melt chamber, the aperture being of a radial extent sufficient to encompass said feed opening, and an interior wall carried by said plate radially inwardly of said feed opening to subdivide the melt chamber into an outer feed area and an inner area free of radially confining walls at which at least partially plasticized material is subjected to the "Weisenberg Effect."

2. In a method of extruding thermoplastic material from an elastic melt extruder having a fixed plate and a rotatable plate provided, respectively, with axially spaced, confronting faces defining a cylindrical melt chamber therebetween by feeding unplasticized material to said chamber at a peripheral location so that rotation of said rotatable plate centripetally advances material through chamber for issuance in a plasticized state through an extrusion orifice formed in one of said plates and located at the axis of said chamber, the steps of forcibly feeding said unplasticized material through said fixed plate into said chamber for direct impingement on said rotatable plate to be deflected thereby into an arcuate path, peripherally confining material in said chamber to a circulatory path, said material being free of confinement in the radial direction for at least part of the travel thereof to said extrusion orifice to promote plasticizing of the material by the normal force effect, and deflecting such material away from the feeding location to prevent intermingling of freshly fed material and material in said circulatory path.

3. In an elastic melt extruder of the type wherein a pair of relatively rotatable plates define therebetween the opposing radial faces of a melt chamber in which particulate thermoplastic material is advanced centripetally to a central outlet orifice to be issued therethrough in a plasticized state, and means for forcibly introducing particulate material into said melt chamber through a feed opening in one of said plates opening directly onto said chamber, the improvements of a melt chamber-defining plate fixed to said one of said pair of plates and axially interposed between said pair of faces, said chamber-defining plate having a central aperture therein opening at each axial extent onto said opposing radial faces, the peripheral wall of said aperture being of variant radius to helically circumscribe the melt chamber, the greatest radius of said wall being of a radial extent sufficient to lie exteriorly of said feed opening, and the smallest radius of said wall defining an interior projection lying radially inwardly of said feed opening to deflect from said feed opening at least partially plasticized material previously introduced into said chamber, the remainder of said central aperture having no radially confining walls.

4. In a method of extruding thermoplastic material from an elastic melt extruder having a fixed plate and a rotatable plate provided, respectively, with axially spaced, confronting faces defining a cylindrical melt chamber therebetween, so that rotation of said rotatable plate centripetally advances particulate material through said chamber for issuance in a plasticized state through an extrusion orifice formed in one of said plates and located at the axis of said chamber, the steps of feeding particulate material through said fixed plate into said chamber for direct impingement on said rotatable plates to be deflected thereby into an arcuate path, confining the particulate material after its initial introduction into said chamber to a path at the outer periphery of said chamber deflecting at least partially plasticized material away from the feeding location to prevent intermingling of freshly fed material and said at least partially plasticized material, and freely accommodating movement of at least partially plasticized material from said path as the material is subjected to the Weisenberg Effect.

5. In a method of extruding thermoplastic material from an elastic melt extruder having a fixed plate and a rotatable plate provided with axially spaced confronting faces defining a melt chamber therebetween, relative rotation of said plates centripetally advancing plasticized material through said chamber for issuance in a plasticized state through an extrusion orifice formed in one of said plates, the steps of feeding unplasticized material into the melt chamber, confining said material interiorly of said chamber to a peripheral path of flow in said chamber until such time as said material is at least partially plasticized, preventing any intermingling of said at least partially plasticized material and unplasticized material entering the chamber, and after said material has traversed said peripheral flow path, providing a radially unconfined flow of said material to said extrusion orifice for plasticizing said material by the normal force effect.

6. In a method of extruding thermoplastic material from an elastic melt extruder having a fixed plate and a roatable plate provided with axially spaced confronting faces defining a melt chamber therebetween, relative rotation of said plates centripetally advancing plasticized material through said chamber for issuance in a plasticized state through an extrusion orifice formed in one of said plates, the steps of feeding unplasticized material through said fixed plate at an aperature leading into the melt chamber, obstructing the free flow of material in said chamber to (1) confine said material to a peripheral path of flow until such time as said material is at least partially plasticized and (2) to prevent intermingling of such at least partially plasticized material at said aperture and unplasticized material, and accommodating radially unconfined centripetal movement of said at least partially plasticized material from said peripheral path and toward said orifice.

7. In an elastic melt extruder of the type wherein a pair of relatively rotatable plates define therebetween the opposing radial faces of a melt chamber in which particulate thermoplastic material is advance centripetally to a central outlet orifice to be issued therethrough in a plasticized state, and means for introducing particulate material into said melt chamber through a feed opening in one of said plates opening directly onto said chamber, the improvements of a chamber plate fixed to said one of said pair of plates and axially interposed between said pair of faces, said chamber plate having a central aperture therein opening onto said opposing radial faces, the peripheral wall of said aperture circumscribing the chamber, the aperture being of a radial extent sufficient to encompass said feed opening, and an interior wall less than 360° in arcuate extent carried by said plate, said wall projecting from the plate and into said aperture radially inwardly of said feed opening (1) to deflect from said feed opening at least partially plasticized material in said chamber and (2) to prevent any back-flow of such material through said feed opening, said aperture having no radially confining wall beyond the termination of said interior wall and thereby accommodating plasticizing of material by the normal force effect in said aperture.

8. In a method of extruding thermoplastic material from an elastic melt extruder having relatively rotatable plates provided with axially spaced, confronting faces defining a cylindrical melt chamber therebetween, particulate material being fed into said chamber so that relative rotation of said plates will centripetally advance plasticized material through said chamber for issuance in a plasticized state through an extrusion orifice formed in one of said plates, the steps of subdividing the interior of said chamber into an outer peripheral chamber and an interior chamber, said inner chamber being free of radially confining walls to allow plasticizing of material by the normal force effect, retaining said material in said outer chamber until the material is at least partially plasticized, accommodating the flow of such partially plasticized material into said inner chamber, and preventing intermingling of material from said chambers.

References Cited by the Examiner

UNITED STATES PATENTS 3,068,517 12/1962 Blackmore _____ 18—12
3,153,686 10/1964 Adams _____ 264—176

FOREIGN PATENTS 1,262,650 4/1961 France.

ALEXANDER H. BRODMERKEL, *Primary Examiner.*

J. H. WOO, *Assistant Examiner.*

UNITED STATES PATENT OFFICE
CERTIFICATE OF CORRECTION

Patent No. 3,303,253                              February 7, 1967

James E. Henry

It is hereby certified that error appears in the above numbered patent requiring correction and that the said Letters Patent should read as corrected below.

Column 8, line 6, for "plates" read -- plate --; line 35, for "roatable" read -- rotatable --; lines 46 and 47, for "at said aperture and unplasticized material," read -- and unplasticized material at said aperture, --.

Signed and sealed this 17th day of December 1968.

(SEAL)
Attest:

Edward M. Fletcher, Jr.
Attesting Officer

EDWARD J. BRENNER
Commissioner of Patents